Patented Apr. 17, 1934

1,955,527

UNITED STATES PATENT OFFICE 1,955,527

METHOD OF TREATING WAXES AND THE LIKE, AND NOVEL PRODUCT OBTAINED THEREBY

Harry Bennett, Brooklyn, N. Y.

No Drawing. Application May 3, 1932, Serial No. 609,047

13 Claims. (Cl. 134—15)

The invention relates to the treatment of waxes, fats, resins and like organic compounds solid at ordinary temperatures, and to the novel product obtained thereby.

It has for an object to render such organic products more viscous, more readily soluble in organic solvents, and of a nature, when in the molten state, to set and harden or congeal more slowly on being permitted to cool and embodying in the molten state a stringy or jelly-like structure.

A further object of the invention resides in the provision of a novel reaction product resulting from the combination of an organic compound, which is non-liquid at ordinary temperatures, with a divalent or trivalent metal compound of a fatty acid containing more than 5 carbon atoms, or an ester of such compound.

In carrying out the process, a wax or other solid hydrocarbon, or vegetable or animal waxes such as carnuba, japan wax, spermaceti, etc., or a fat such as beef-fat, or a resin such as rosin or ester gum, or condensation products of polyhydric alcohols and fatty acids or dibasic acids or their anhydrids, is caused to react with a compound of the aforesaid nature, for example, aluminum cetylacetate or with a metallic soap such as titanium abietate, barium oleate, magnesium myristicate, etc., or esters thereof.

As a typical example, 100 parts by weight of ozokerite is heated, for example, from 100° C. to 200° C., with stirring; and to this is then added slowly and with stirring, ten or more parts of aluminum cetylacetate. The stirring is continued until the mixture becomes clear. While a lower temperature is also suitable, the reaction will proceed at a slower rate, and, correspondingly, by elevating the temperature the reaction may be accelerated.

The novel product thus attained is allowed to cool and solidify, whereupon it is ready for use. Upon remelting, it reassumes its stringy and jelly-like form.

Increasing the proportion of the reacting compound will cause an increase in the viscosity, melting point, congealation temperature and the solubility of the finished product, and vice versa.

Paraffin may similarly be treated with the aluminum cetylacetate.

The novel products have a melting point over 50% higher than that of the original solid organic material, and the viscosity is very materially increased. Moreover, the products are especially soluble in such organic solvents as carbon tetrachloride, turpentine, benzol, naphtha, etc. In cooling, an appreciable time is required before the product becomes solid or set.

The novel product affords a satisfactory substitute for paraffin in the waterproofing of textiles, fibres and cordage; and thin films of this wax-like product are more flexible, more adhesive than the paraffin and also possess a higher melting point.

It is particularly suitable, also, as an ingredient of chewing gum, being substituted for the paraffin or other waxes generally used therein, in that the heat of the mouth in the chewing of the gum, while softening this novel product, will not cause it to soften to so great an extent as in the case of paraffin. This is of particular advantage in that this filler material helps to retain the body and viscosity of the mass while being chewed.

I claim:

1. The method of treating hydrocarbons solid at ordinary temperatures to render the same more viscous, more soluble in organic solvents and to provide them of a higher melting point, which consists in heating to a temperature in excess of 100° C. such solid hydrocarbons with a compound of a multivalent metal and a fatty acid containing more than 5 carbon atoms, and allowing the mixture to solidify.

2. The method of treating hydrocarbons solid at ordinary temperatures to render the same more viscous, more soluble in organic solvents and to provide them of a higher melting point, which consists in heating to a temperature in excess of 100° C. such solid hydrocarbons with an ester of a compound of a multivalent metal and a fatty acid containing more than 5 carbon atoms, and allowing the mixture to solidify.

3. The method of treating ozokerite to render the same more viscous, more soluble in organic solvents and to provide it of a higher melting point, which comprises heating to a temperature in excess of 100° C. the ozokerite with a compound of a multivalent metal and a fatty acid containing more than 5 carbon atoms.

4. The method of treating a paraffin to render the same more viscous, more soluble in organic solvents and to provide it of a higher melting point, which comprises heating to a temperature in excess of 100° C. paraffin with a compound of a multivalent metal and a fatty acid containing more than 5 carbon atoms.

5. The method of treating ozokerite to render the same more viscous, more soluble in organic solvents and to provide it of a higher melting point, which comprises heating the ozokerite with aluminum cetylacetate.

6. The novel composition of matter obtained by heating ozokerite with aluminum cetylacetate.

7. The novel composition of matter obtained by heating 100 parts of ozokerite at from 100° C. to 200° C. with 10 or more parts of aluminum cetylacetate.

8. The novel composition of matter obtained by heating paraffin with aluminum cetylacetate.

9. The novel compound comprising the reaction product obtained by heating 100 parts of paraffin at from 100° C. to 200° C. with 10 or more parts of aluminum cetylacetate.

10. The novel composition of matter obtained by heating to a temperature in excess of 100° C. a hydrocarbon solid at ordinary temperature with a compound of a multivalent metal and a fatty acid containing more than 5 carbon atoms.

11. The novel composition of matter obtained by heating to a temperature in excess of 100° C. a paraffin with a compound of a multivalent metal and a fatty acid containing more than 5 carbon atoms.

12. The novel composition of matter consisting of a treated hydrocarbon, solid at ordinary temperature, which possesses when molten increased viscosity and increased solubility in organic solvents and obtained by heating the hydrocarbon with aluminum cetylacetate.

13. The method of treating a hydrocarbon to render the same more viscous, more soluble in organic solvents and to provide it with a higher melting point, which comprises heating the hydrocarbon with aluminum cetylacetate.

HARRY BENNETT.